(12) United States Patent
Li et al.

(10) Patent No.: US 8,164,995 B2
(45) Date of Patent: Apr. 24, 2012

(54) ENHANCED LINEARITY DVD WRITING CURRENT CIRCUIT

(75) Inventors: Eric Li, Milpitas, CA (US); Yi Zhang, Mountain View, CA (US)

(73) Assignee: Silicon Core Technology, Inc., Milpitas, CA (US)

( * ) Notice: Subject to any disclaimer, the term of this patent is extended or adjusted under 35 U.S.C. 154(b) by 0 days.

(21) Appl. No.: 12/930,204

(22) Filed: Dec. 29, 2010

(65) Prior Publication Data

US 2011/0158075 A1      Jun. 30, 2011

Related U.S. Application Data

(63) Continuation of application No. 12/074,485, filed on Mar. 3, 2008, now Pat. No. 7,889,609.

(30) Foreign Application Priority Data

Sep. 26, 2006   (WO) ................ PCT/US2006/037749

(51) Int. Cl.
     *G11B 7/004*       (2006.01)
(52) U.S. Cl. .................................. 369/47.51; 369/59.11
(58) Field of Classification Search .................. None
     See application file for complete search history.

(56) References Cited

U.S. PATENT DOCUMENTS

| | | | |
|---|---|---|---|
| 4,331,886 A | 5/1982 | Perner et al. | |
| 5,457,433 A | 10/1995 | Westwick | |
| 5,623,216 A | 4/1997 | Penza et al. | |
| 5,732,055 A | 3/1998 | Masaki et al. | |
| 5,781,045 A | 7/1998 | Walia et al. | |
| 6,100,725 A | 8/2000 | Aswell et al. | |
| 6,317,405 B1 | 11/2001 | Arai | |
| 6,414,932 B1 | 7/2002 | Kaku et al. | |
| 6,653,886 B1 | 11/2003 | Lee et al. | |
| 6,654,328 B2 | 11/2003 | Kaku et al. | |
| 6,958,631 B2 | 10/2005 | Aiba et al. | |
| 7,336,687 B2 | 2/2008 | Kubota | |
| 7,570,568 B2 | 8/2009 | Li | |

(Continued)

FOREIGN PATENT DOCUMENTS

JP      2000216470 A      8/2000

(Continued)

OTHER PUBLICATIONS

U.S. Patent Application Publication 2002/0061040 A1, May 23, 2002.

(Continued)

*Primary Examiner* — Wayne Young
*Assistant Examiner* — Brian Butcher
(74) *Attorney, Agent, or Firm* — Donal E. Schreiber (57) ABSTRACT

A writing current circuit (42) supplies a controlled electrical current to a laser diode (34) for recording data swiftly onto a DVD (16). A plurality of current sources (62) in the writing current circuit (42) supply electrical current directly to the laser diode (34). Each current source (62) respectively receives a single output signal from a current control register (52) included in the writing current circuit (42) which activates or deactivates the current source (62) for supplying a particular quantity of current to the laser diode (34). In one aspect, a pair of current reference signals received by the current source (62) control electrical current supply to the diode (34). Incorporated into these controlling reference signals is a simulation of electrical characteristics of the diode (34). In another aspect, each current source (62) responds to a logical inverse of the output signal from the current control register (52) for controlling overshoot in voltage applied across the diode (34).

4 Claims, 7 Drawing Sheets

U.S. PATENT DOCUMENTS 7,609,735 B2    10/2009    Kubota

FOREIGN PATENT DOCUMENTS

| JP | 2000-306255 | 11/2000 |
| JP | 2001043531 A | 2/2001 |
| JP | 2005-251907 | 9/2005 |
| WO | WO 02/51009 A1 | 6/2002 |
| WO | WO 2005/069863 A2 | 8/2005 |

OTHER PUBLICATIONS

U.S. Patent Application Publication 2002/0098806 A1, Jul. 25, 2002.
U.S. Patent Application Publication 2002/0105880 A1, Aug. 8, 2002.
U.S. Patent Application Publication 2002/0190779 A1, Dec. 19, 2002.
U.S. Patent Application Publication 2003/0048712 A1, Mar. 13, 2003.
U.S. Patent Application Publication 2003/0048821 A1, Mar. 13, 2003.
U.S. Patent Application Publication 2003/0174607 A1, Sep. 18, 2003.
U.S. Patent Application Publication 2003/0185127 A1, Oct. 2, 2003.
U.S. Patent Application Publication 2003/0214893 A1, Nov. 20, 2003.
U.S. Patent Application PublicatiOn 2003/0227844 A1, Dec. 11, 2003.
U.S. Patent Application Publication 2004/0047255 A1, Mar. 11, 2004.
U.S. Patent Application Publication 2005/0280457A1, Dec. 22, 2005.

ENHANCED LINEARITY DVD WRITING CURRENT CIRCUIT

This patent application is a continuation of copending U.S. patent application Ser. No. 12/074,485 entitled "Enhanced Linearity DVD Writing Current Circuit" that was filed Mar. 3, 2008, with the United States Patent and Trademark Office ("USPTO"), and that claimed priority under 35 U.S.C. §371 from PCT International Patent Application PCT/US2006/037749 filed Sep. 26, 2006.

TECHNICAL FIELD

The present disclosure relates generally to optical digital data recording, and, more particularly, to a circuit that permits writing Digital Video Discs ("DVDs") swiftly.

BACKGROUND ART

Figure 1:
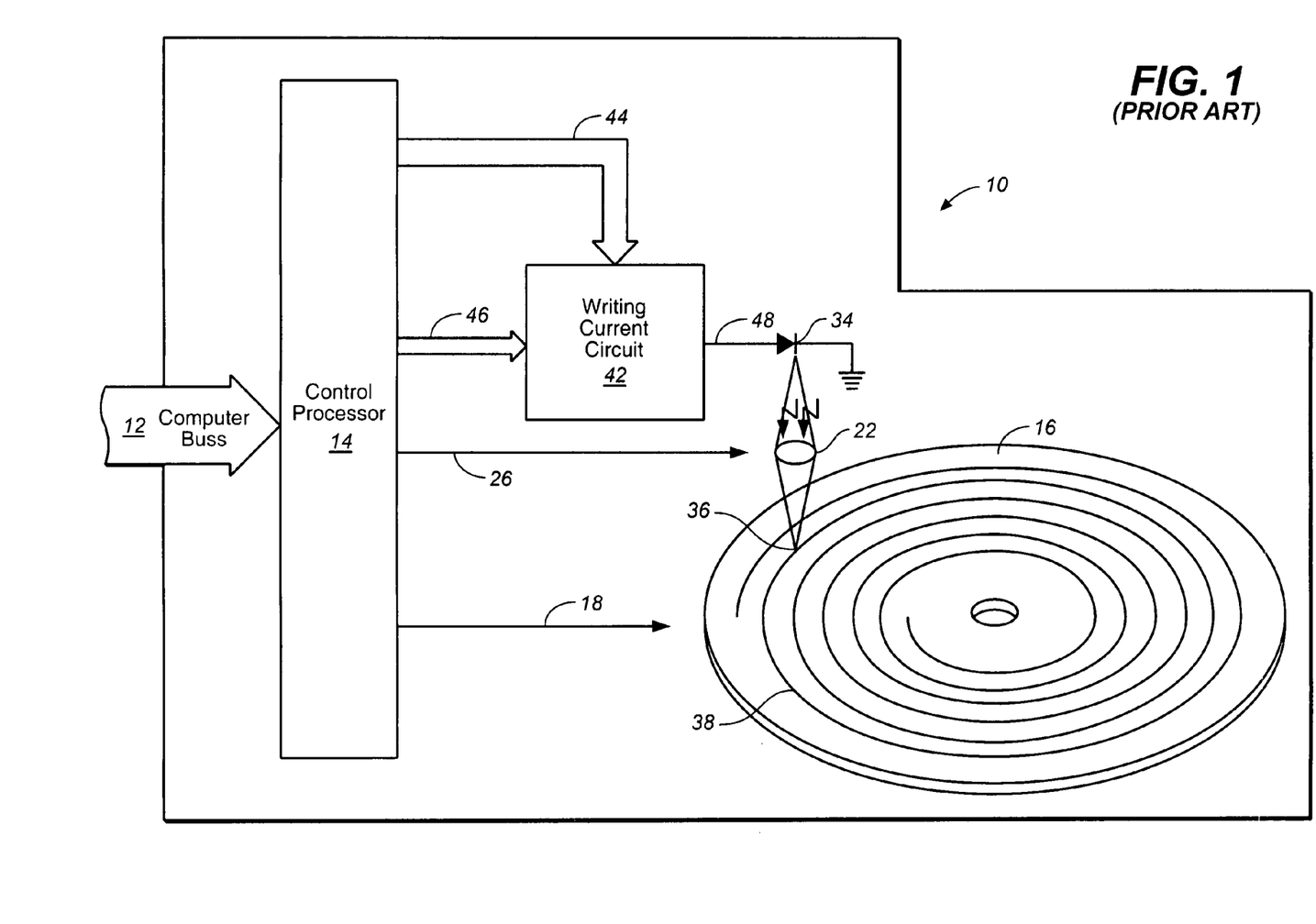
FIG. 1 is a block diagram that depicts selected portions of a prior art drive adapted for writing CDs or DVDs.

The block diagram of FIG. 1 depicts selected portions of a prior art drive referred to by the general reference character 10. FIG. 1 particularly illustrates those portions of the drive 10 which adapt it for recording digital data on a Compact Disc ("CD") or DVD.

The drive 10, which is usually incorporated into a digital computer, exchanges digital data with other portions of the digital computer via a computer bus 12. For purposes of the present disclosure, the drive 10 may be understood conceptually as including a control processor 14, although drives 10 may be actually constructed in various other different ways. Responsive to commands which the drive 10 receives via the computer bus 12, the control processor 14, among other things, supervises:

1. rotation of a CD or DVD 16 received into the drive 10 indicated in FIG. 1 by an arrow 18; and
2. operation of an optical subsystem 22 indicated in FIG. 1 by an arrow 26.

The optical subsystem 22 focuses light, generated by a laser diode 34, to a spot 36 that is located along a track 38 which spirals inward across the surface of the CD or DVD 16. The control processor 14 operates in fundamentally the same manner for supervising rotation of the CD or DVD 16 and operation of the optical subsystem 22 both while the drive 10 records digital data onto the CD or DVD 16, and while the drive 10 reads previously recorded data from the CD or DVD 16.

When recording data onto the CD or DVD 16, the control processor 14 may be understood as supplying to an integrated circuit ("IC") writing current circuit 42:

1. write control data via a writing control bus 44; and
2. serial data for recording along the spiral track 38 via lines that are included in a recorded data bus 46.

In turn, the writing current circuit 42 supplies a controlled electrical current to the laser diode 34 via a current output line 48 to generate a temporally changing light beam which the optical subsystem 22 focuses at the spot 36 on the track 38. Heating of the CD or DVD 16 due to the beam of light impinging at the spot 36 alters the physical properties of the CD or DVD 16 thereby recording along the track 38 the digital data which the writing current circuit 42 receives via the recorded data bus 46.

While recording onto the CD or DVD 16, the energy of the light beam generated by the laser diode 34 must be controlled to heat the CD or DVD 16 at the spot 36 to a precise temperature needed to change the physical properties of the CD or DVD 16. Consequently, the electrical current which the writing current circuit 42 supplies to the laser diode 34 must be precisely controlled responsive to various different recording conditions which include:

1. the physical characteristics of various different types of CDs or DVDs 16 that may be loaded into the drive 10;
2. the speed at which the CD or DVD 16 rotates; and
3. the location of the spot 36 along the spiral track 38.

Figure 2:
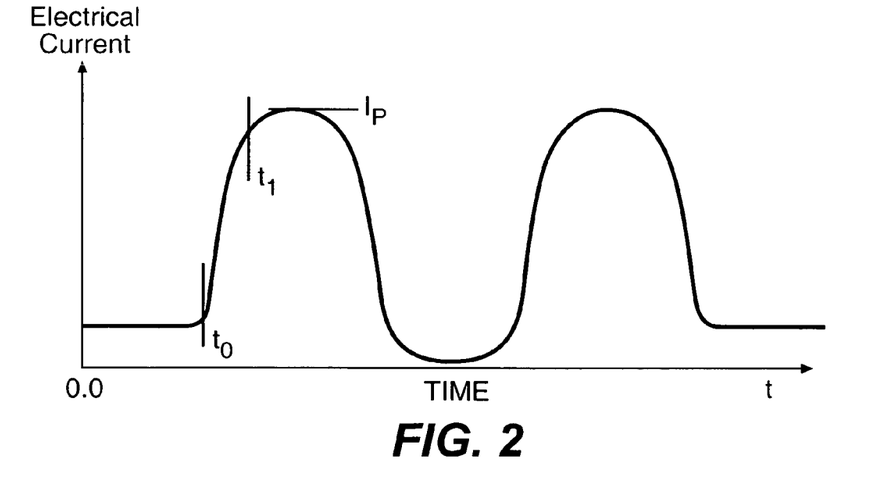
FIG. 2 is a waveform diagram illustrating electrical current which a writing current circuit supplies to a laser diode while writing a single bit of digital data.

The waveform diagram of FIG. 2 depicts how electrical current supplied by the writing current circuit 42 to the laser diode 34 varies during recording of a single bit of digital data onto the CD or DVD 16. Depending upon specific recording conditions, in conventional drives 10 the electrical current which the writing current circuit 42 supplies to the laser diode 34 when recording onto a CD at 52× increases from a nominal value of approximately ten milliamperes ("ma") at time $t_0$ to as much as several hundred ma at time $t_1$, a time interval of approximately one nanosecond. The maximum electrical current supplied to the laser diode 34, $I_P$, may be as great as 350 ma. An electrical current supplied to the laser diode 34 which increases too swiftly or overshoots excessively can destroy the CD or DVD 16.

A significant performance difference required for a writing current circuit 42 adapted for recording digital data onto a CD and a writing current circuit 42 adapted for recording digital data onto a DVD arises from the smaller size spot 36 written on DVDs. The size of the spot 36 recorded onto DVDs is approximately one-seventh (⅐) the size of the spot 36 recorded onto CDs. Consequently, for the same rotation speed of the CD or DVD 16, data must be written seven (7) times faster when recording onto a DVD than when recording onto a CD. Correspondingly, for the same rotation speed the interval during which the light beam heats the spot 36 while writing a single bit of digital data onto a DVD is only one-seventh (⅐) of the interval for writing digital data onto a CD. Therefore, for media having similar physical properties the beam of light produced by the laser diode 34 must heat a DVD seven (7) times faster than the beam of light used for recording digital data onto a CD.

The write control data the control processor 14 supplies to the writing current circuit 42 via a writing control bus 44 includes data which specifies the amount of electrical current which the writing current circuit 42 supplies to the laser diode 34 while recording digital data onto the CD or DVD 16. It is advantageous for controlling the operation of the drive 10 while recording digital data if the electrical current which the writing current circuit 42 supplies to the laser diode 34 changes as linearly as practicable responsive to write control data which specifies the amount of that current.

DISCLOSURE

An object of the present disclosure is to provide a writing current circuit that permits writing digital data more swiftly.

Another object of the present disclosure is to provide a writing current circuit that supplies to the laser diode of an optical recording device an electrical current that changes smoothly.

Another object of the present disclosure is to provide a writing current circuit that supplies to the laser diode of an optical recording device an electrical current controllably.

Another object of the present disclosure is to provide a writing current circuit that supplies the laser diode of an optical recording device with an electrical current that exhibits the same rise time and same overshoot regardless of the amount of electrical current being supplied thereto.

Another object of the present disclosure is to provide a writing current circuit that supplies the laser diode of an optical recording device with an electrical current that exhibits less overshoot regardless of the amount of electrical current being supplied thereto.

Another object of the present disclosure is to provide a writing current circuit that supplies the laser diode of an optical recording device with an electrical current that exhibits better linearity in the amount of electrical current being supplied thereto responsive to a control signal therefor.

Briefly, a disclosed writing current circuit and method of operation thereof is adapted for supplying a controlled electrical current to a laser diode included in a drive adapted for swiftly recording a DVD. The writing current circuit operates in response both:

a. to write control digital data for controlling operation of the writing current circuit, the write control digital data including data which specifies an amount of electrical current which the writing current circuit controllably supplies to the laser diode; and b. to serial digital data which controls application of the electrical current to the laser diode thereby specifying digital data to be recorded on the DVD.

The writing current circuit receives both the write control digital data and the serial digital data from a control processor included in the drive.

The writing current circuit includes a plurality of separate current sources each of which receives a single output signal from a current control register included in the writing current circuit. The output signal respectively received by each current source from the current control register:

a. when in a first state activates the receiving current source for supplying a particular quantity of electrical current to the laser diode; and b. when in a second state deactivates the receiving current source for supplying the particular quantity of electrical current to the laser diode.

In one aspect of the present disclosure, each current source, in addition to receiving the single output signal from the current control register, also receives both:

a. a first current reference voltage signal which controls how much electrical current the current source supplies to the laser diode when the single output signal received by the current source from the current control register is in the first state; and b. a second current reference voltage signal for controlling the charging electrical current supplied to the laser diode by current source when the single output signal received by the current source from the current control register initially enters the first state.

In this particular aspect of the disclosure, a complementary voltage reference circuit responds to write control digital data from the control processor for controlling both the first current reference voltage signal and the second current reference voltage signal. The complementary voltage reference circuit in controlling the first current reference voltage signal and the second current reference voltage signal simulates electrical characteristics of the laser diode for improving linearity between the write control digital data received from the control processor and electrical current supplied to the laser diode.

In another aspect of the present disclosure, each current source, in addition to receiving the single output signal from the current control register, also responds to a logical inverse of the single output signal for controlling overshoot in voltage applied to the laser diode.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 7 depicts a relationship existing between FIGS. 7A and 7B, the combined FIGS. 7A and 7B depicting an output stage circuit diagram for preferred embodiment current sources included in the writing current circuit depicted in FIG. 3.

BEST MODE FOR CARRYING OUT THE INVENTION

Figure 3:
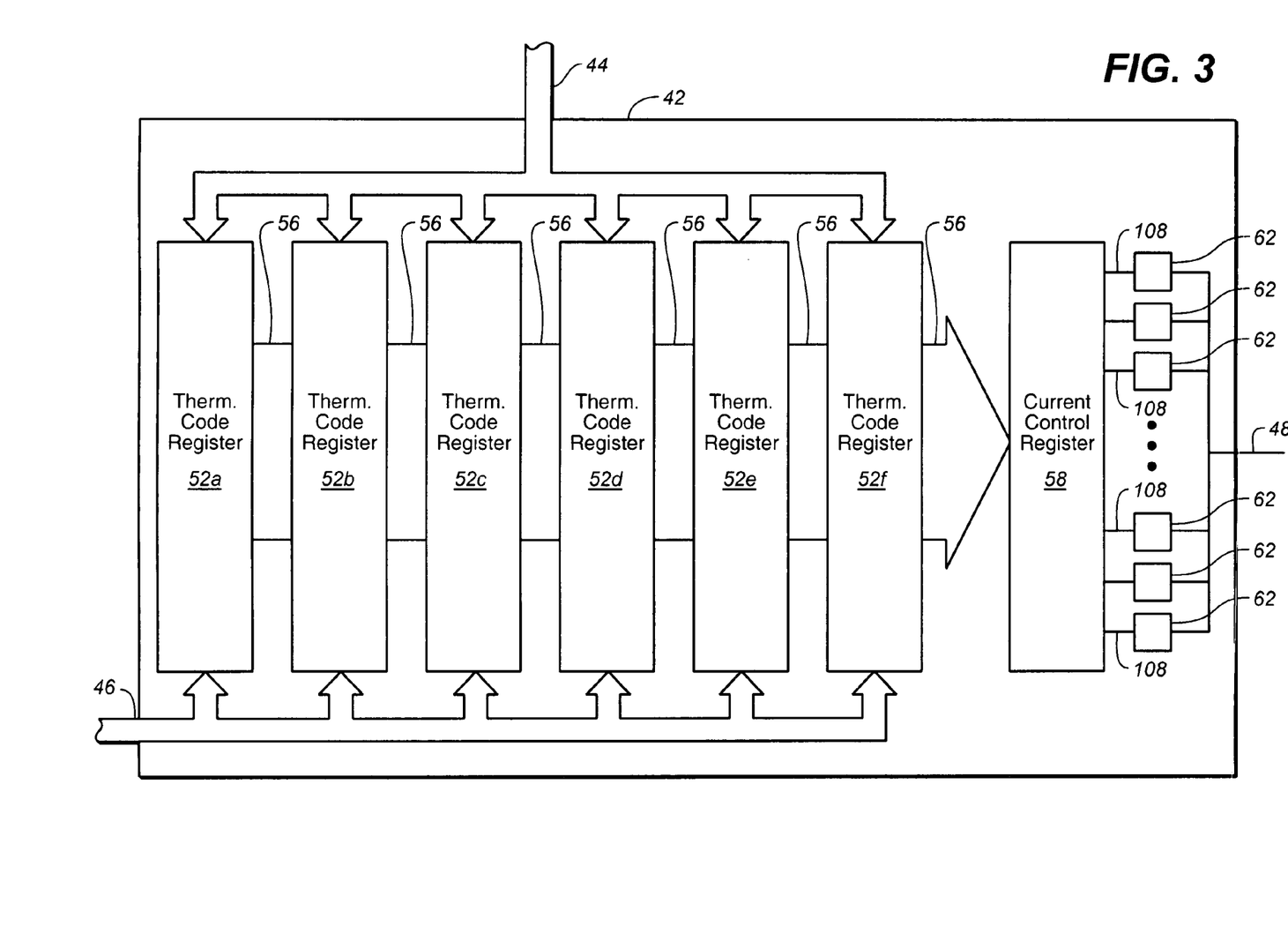
FIG. 3 is a block diagram depicting an IC writing current circuit in accordance with the present disclosure.

The block diagram of FIG. 3 illustrates a writing current circuit 42 in accordance with the present invention that is adapted for inclusion in an IC. The writing current circuit 42 includes, in the specific embodiment depicted in FIG. 3, six (6) thermometer code registers 52a-52f. Via the writing control bus 44, the control processor 14 stores into each of the thermometer code registers 52 a numerical value which specifies a particular quantity of electrical current which the writing current circuit 42 may supply to the laser diode 34. During digital data recording, a thermometer code transfer bus 56 receives a numerical value from a selected one of the thermometer code registers 52a-52f that the writing current circuit 42 stores into a current control register 58. Serial digital data received by the writing current circuit 42 via the recorded data bus 46 specifies a sequence in which specific thermometer code registers 52 supply their respective numerical values to the thermometer code transfer bus 56 for supplying a particular electrical current waveform to the laser diode 34. Accordingly, the control processor 14 sends digital data via signal lines included in the recorded data bus 46 for selecting a specific one of the thermometer code registers 52a-52f for supplying its numerical value to the thermometer code transfer bus 56 beginning at a specific instant in time, and then subsequently selecting another of the thermometer code registers 52a-52f for supplying its numerical value to the thermometer code transfer bus 56 beginning at a subsequent instant in time. The thermometer code registers 52a-52f, the thermometer code transfer bus 56 and current control register 58 are configured so that all bits in each successive numerical value transferred across the thermometer code transfer bus 56 are stored into the current control register 58 as near to simultaneously as practicable.

In the presently preferred embodiment of the writing current circuit 42, sixty-four (64) separate current sources 62, only six (6) of which appear in FIG. 3, receive output signals from the current control register 58. The output signals from the current control register 58, specified by the numerical value of the thermometer code then present in the current control register 58, activate or deactivate individual current sources 62 which supply their combined electrical current to the current output line 48. In this way, during the recording of each bit of digital data, the current control register 58 receives and stores a sequence of thermometer code numerical values that cause the writing current circuit 42 to supply the laser diode 34 with an electrical current having a specific waveform that is specified by data loaded into the writing current circuit 42 by the control processor 14.

Figure 4:
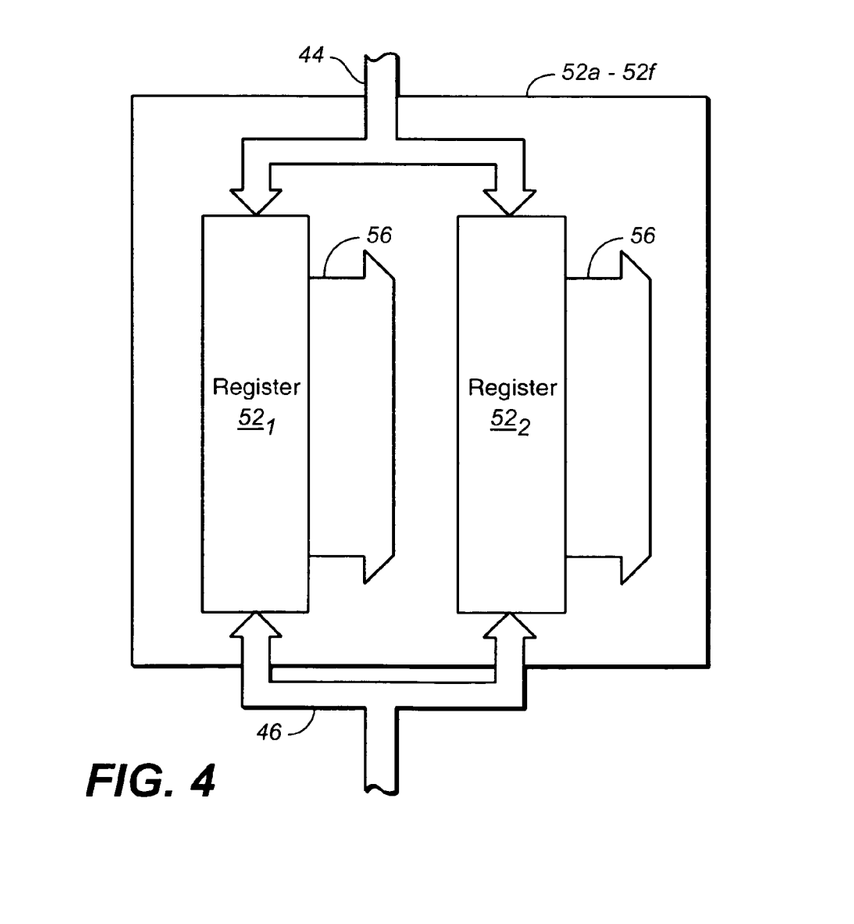
FIG. 4 is a block diagram depicting a thermometer, code register of the type included in the writing current circuit depicted in FIG. 3.

Because the specific waveform that the writing current circuit 42 supplies to the laser diode 34 varies depending upon the location of the spot 36 along the spiral track 38, as recording proceeds from the outer region of the track 38 to the inner region the control processor 14 must change the numerical value of thermometer codes stored in the thermometer code registers 52a-52f dynamically without disturbing digital data recording. Thus, as illustrated in FIG. 4 each of the thermometer code registers 52a-52f is, in fact, preferably a logical register that includes two (2) physical registers $52_1$ and $52_2$. During recording of digital data, only the numerical temperature code stored in one of the registers $52_1$ or $52_2$, for example register $52_1$, is available for transfer onto the thermometer code transfer bus 56. Conversely, if the register $52_1$ may be transferred onto the thermometer code transfer bus 56 then the control processor 14 may store a new temperature code value only into the register $52_2$. Immediately after the control processor 14, stores a new temperature code value into one of the registers $52_1$ or $52_2$, only that value may be transferred onto the thermometer code transfer bus 56, and the register $52_1$ or $52_2$ whose data was previously transferable onto the thermometer code transfer bus 56 becomes available for storing the next temperature code value. Arranged in this way, the control processor 14 may store a new temperature code value into any of the thermometer code registers 52a-52f at any time without disturbing the electrical current which the writing current circuit 42 is then supplying to the current output line 48.

Figure 5:
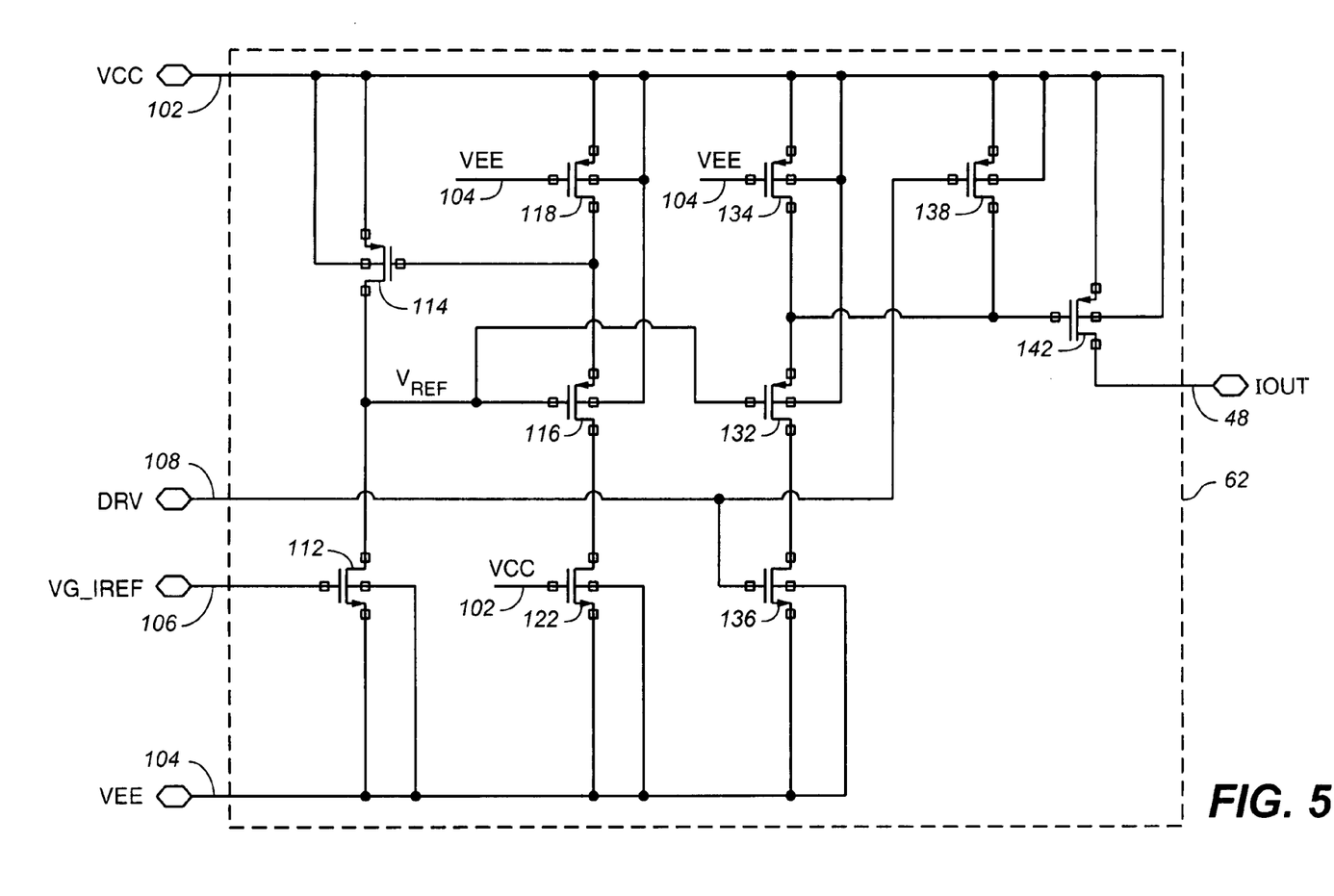
FIG. 5 is an output stage circuit diagram depicting one embodiment of current sources included in the writing current circuit depicted in FIG. 3.

Each current source 62 may include an output stage of the type depicted in the circuit diagram of FIG. 5. Each current source 62 receives voltage common cathode ("VCC") and ground ("VEE") electrical power respectively via a VCC power line 102 and a VEE power line 104. Each current source 62 also receives via a current-reference signal line 106 an adjustable current-reference voltage signal VG_IREF that is supplied by a voltage reference circuit included in the IC, not illustrated in any of the FIGs. Data supplied by the control processor 14 to the voltage reference circuit controls the voltage of the VG_IREF signal. Each bit in the current control register 58 supplies a single on-off digital signal to each of the current sources 62 included in the writing current circuit 42 via a DRV signal line 108.

The current source 62 is preferably fabricated as part of a complementary metal oxide silicon ("CMOS") IC. As is well known to those skilled in the art of designing CMOS ICs, such ICs include both N-MOS and P-MOS transistors. For the CMOS IC depicted in FIG. 5, the N-MOS transistors are preferably fabricated directly on a silicon semiconductor substrate that contains a p-type dopant material. Alternatively, the P-MOS transistors are formed at wells of semiconductor material which during CMOS IC fabrication are established by placing n-type dopant material into the p-type substrate. Thus, the dopant material used in forming wells for P-MOS transistors in CMOS ICs is complementary to the dopant material of the ICs' silicon semiconductor substrate. For this type of CMOS IC, the well of n-type semiconductor material established in the p-type silicon semiconductor substrate for forming P-MOS transistors is frequently referred to as an n-well.

Within each current source 62, a gate of a N-MOS transistor 112 receives the voltage signal VG_IREF present on the current-reference signal line 106. A source and substrate of the N-MOS transistor 112 connect to the VEE power line 104. A drain of the N-MOS transistor 112 connects to a drain of a P-MOS transistor 114. A source and n-well of the P-MOS transistor 114 connect to the VCC power line 102. The drains both of the N-MOS transistor 112 and of the P-MOS transistor 114 connect to a gate of a P-MOS transistor 116. A source of the P-MOS transistor 116 connects both to a gate of the P-MOS transistor 114 and to a drain of a P-MOS transistor 118. A gate of the P-MOS transistor 118 connects to the VEE power line 104 while the source of the P-MOS transistor 118 and the n-wells of both P-MOS transistors 118, 116 connect to the VCC power line 102. A drain of the P-MOS transistor 116 connects to a drain of a N-MOS transistor 122. A gate of the N-MOS transistor 122 connects to the VCC power line 102 while the source and substrate of the N-MOS transistor 122 connect to the VEE power line 104.

Configured in this way with the current-reference voltage signal VG_IREF applied to the gate of the N-MOS transistor 112, the N-MOS transistor 112 operates as a constant current sink for current flowing through the P-MOS transistor 114 from the VCC power line 102. The series connected P-MOS transistor 114 and N-MOS transistor 112 together with the series connected P-MOS transistor 118, P-MOS transistor 116 and N-MOS transistor 122 establish a constant reference voltage $V_{REF}$ at the series connected drains of the N-MOS transistor 112 and P-MOS transistor 114 and the gate of the P-MOS transistor 116. Connection of the source of the P-MOS transistor 116 to the gate of the P-MOS transistor 114 establishes a feedback circuit for controlling and stabilizing the reference voltage $V_{REF}$.

In addition to being applied to the gate of the P-MOS transistor 116, the constant reference voltage $V_{REF}$ is also applied to a gate of a P-MOS transistor 132. A source of the P-MOS transistor 132 connects to a drain of a P-MOS transistor 134. A gate of the P-MOS transistor 134 connects to the VEE power line 104 while the source of the P-MOS transistor 134 and the n-wells of both P-MOS transistors 134, 132 connect to the VCC power line 102. A drain of the P-MOS transistor 132 connects to a drain of a N-MOS transistor 136. A gate of the N-MOS transistor 136 connects to the DRV signal line 108 while the source and substrate of the N-MOS transistor 136 connect to the VEE power line 104.

Configured in this way, when the on-off digital signal applied to the DRV signal line 108 by one of the bits in the current control register 58 turns the N-MOS transistor 136 on, an electrical current flows through the series connected P-MOS transistors 134, 132 and N-MOS transistor 136. Conversely, when the on-off digital signal applied to the DRV signal line 108 by one of the bits in the current control register 58 turns the N-MOS transistor 136 off, no electrical current flows through the series connected P-MOS transistors 134, 132 and N-MOS transistor 136.

Furthermore, arranged in the configuration described thus far, the P-MOS transistor 118 and the P-MOS transistor 134 are in a current mirror relationship, and the P-MOS transistor 116 and the P-MOS transistor 132 are also in a current mirror relationship. Arranging a pair of MOS transistors in a current mirror relationship permits setting a ratio for electrical current flowing through the pair of transistors based upon a size ratio of the two transistors. For the configuration described thus far, the size ratio of the P-MOS transistors 116, 132 is preferably the same as the size ratio of the P-MOS transistors 118, 134, thus the gate-source voltages Vgs of the P-MOS transistors 116, 132 are equal. Since the same voltage $V_{ref}$ is present on the gates of the P-MOS transistors 116, 132, presuming that as preferred the size ratio of the P-MOS transistors 118, 134 is the same as the size ratio of the P-MOS transistors 116, 132, then the voltages at the sources of the P-MOS transistors 116, 132 are identical.

The series connected drain and source of the P-MOS transistors 134, 132 also connect both to a drain of P-MOS transistor 138, and to a gate of a P-MOS transistor 142. The sources and the n-wells of both P-MOS transistors 138, 142 connect to the VCC power line 102. The drain of the P-MOS transistor 142 connects to the current output line 48. Similar to the N-MOS transistor 136, the gate of the P-MOS transistor 132 connects to the DRV signal line 108.

Configured in this way, when the on-off digital signal applied to the DRV signal line 108 by one of the bits in the current control register 58 turns the P-MOS transistor 138 on simultaneously turning the N-MOS transistor 136 off, voltage at the gate of the P-MOS transistor 142 becomes that present on the VCC power line 102, i.e. the same as the voltage at the source of the P-MOS transistor 142, and no electrical current flows through the P-MOS transistor 142 from the VCC power line 102 to the current output line 48. Conversely, when the on-off digital signal applied to the DRV signal line 108 by one of the bits in the current control register 58 turns the P-MOS transistor 138 off simultaneously turning the N-MOS transistor 136 on, voltage at the gate of the P-MOS transistor 142 becomes that present at the sources of the P-MOS transistors 116, 132, and electrical current then flows through the P-MOS transistor 142 from the VCC power line 102 to the current output line 48. During operation of the circuit depicted in FIG. 5, the N-MOS transistor 122 acts to balance the voltages between the drains of the P-MOS transistors 116, 132 so that while the P-MOS transistor 138 is turned off and the N-MOS transistor 136 is turned on the voltage at the gates of P-MOS transistors 114, 142 are identical. Also, while the P-MOS transistor 138 is turned off and the N-MOS transistor 136 is turned on the current-reference voltage signal VG_IREF applied to the gate of the N-MOS transistor 112 controls how much electrical current the current source 62 supplies via the current output line 48 to the laser diode 34.

Furthermore, arranged in the configuration depicted in FIG. 5, the pair of P-MOS transistors 114, 142 are in a current mirror relationship. Thus, the ratio of electrical current flowing through the P-MOS transistors 114, 142 is determined by a size ratio of the P-MOS transistors 114, 142. In this way, the size ratio of the P-MOS transistors 114, 142 determines how much electrical current each of the current sources 62 supplies to the current output line 48 when bits in the current control register 58 turn on the P-MOS transistor 142 included in each of the current sources 62 of the writing current circuit 42.

Figure 6:
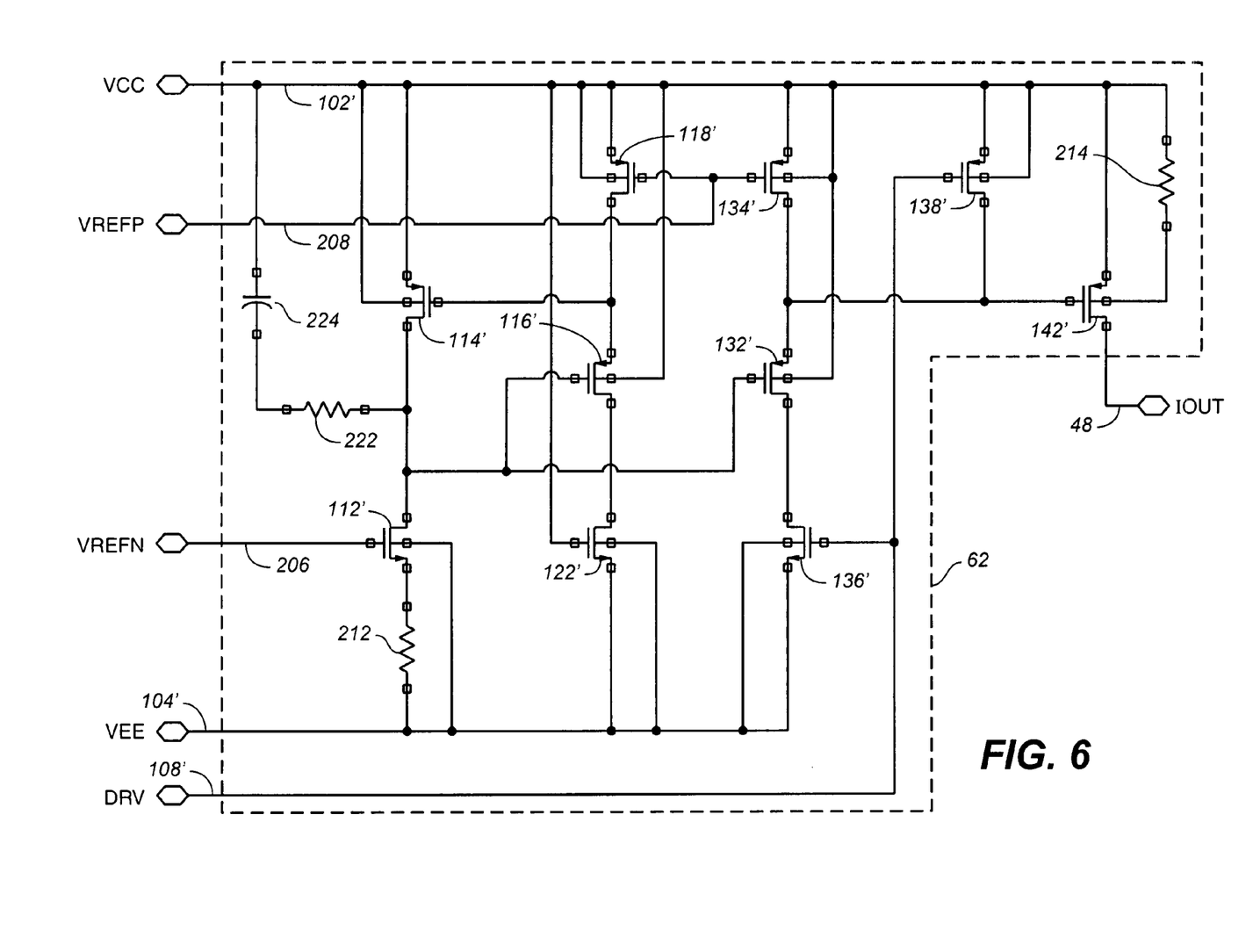
FIG. 6 is an output stage circuit diagram depicting another embodiment of current sources included in the writing current circuit depicted in FIG. 3.

While each current source 62 may include an output stage of the type depicted in FIG. 5, each of the current sources 62 included in the writing current circuit 42 may be an output stage of the type depicted in the circuit diagram of FIG. 6. Those elements depicted in FIG. 6 that are common to the current source 62 illustrated in FIG. 5 carry the same reference numeral distinguished by a prime ("'") designation.

The output stage depicted in FIG. 6 is similar to that depicted in FIG. 5 in receiving an adjustable current-reference signal Voltage Reference Negative ("VREFN") via a N-MOS current-reference signal line 206 which is similar to the current-reference voltage signal VG_IREF depicted in FIG. 5. However, the output stage depicted in FIG. 6 differs from that depicted in FIG. 5 by receiving an adjustable current-reference signal Voltage Reference ("VREFP") via a P-MOS current-reference signal line 208. In the output stage depicted in FIG. 6, the current-reference signal VREFP is supplied to gates both of the P-MOS transistor 118' and of the P-MOS transistor 134' rather than those gates being connected to the VEE power line 104 as in the output stage depicted in FIG. 5. A complementary voltage reference circuit included in the IC, not illustrated in any of the FIGs., supplies the current-reference signals VREFN and VREFP to each of the current sources 62 included in the writing current circuit 42. Similar to the output stage depicted in FIG. 5, data supplied by the control processor 14 to the complementary voltage reference circuit controls the voltages of the VREFN and VREFP signals.

The output stage depicted in FIG. 6 further differs from that depicted in FIG. 5 by including a first resistor 212 connected between the source of the N-MOS transistor 112' and the VEE power line 104'. Also, a second resistor 214 connects between the n-well of the P-MOS transistor 142' and the VCC power line 102'. Lastly, the output stage depicted in FIG. 6 differs from that depicted in FIG. 5 by including a third resistor 222 and a capacitor 224 that connect in series between the VCC power line 102' and the junction of the drains respectively of the N-MOS transistor 112' and P-MOS transistor 114' and the gates respectively of the P-MOS transistor 116' and P-MOS transistor 132'. The resistors 212, 214 and 222 are approximately 100 ohms, and the capacitor 224 is approximately 5 pico-farads.

Adding the current-reference signal VREFP for controlling operation of the P-MOS transistor 118' and the P-MOS transistor 134' permits adjusting the charging current supplied to the current output line 48 by the P-MOS transistor 142' by varying the voltage VREFP. In this way it becomes possible for the writing current circuit 42 to provide the same rise time and same overshoot for electrical current supplied to the laser diode 34 when the P-MOS transistor 138 initially turns off and the N-MOS transistor 136 initially turns on regardless of power level supplied by the current source 62. The resistor 214 in combination with the inherent source to n-well parasitic capacitance of the P-MOS transistor 142 form an embedded low pass filter at the output of the current source 62. The presence of this embedded low pass filter at the output of the current source 62 tends to reduce overshoot and undershoot in the current which the P-MOS transistor 142 supplies to the current output line 48. Lastly, addition of the series connected resistor 222 and capacitor 224 reduces the possibility that the feedback circuit formed by the P-MOS transistor 114' and the P-MOS transistor 116' may oscillate during high speed switching.

Figures 7, 7A:
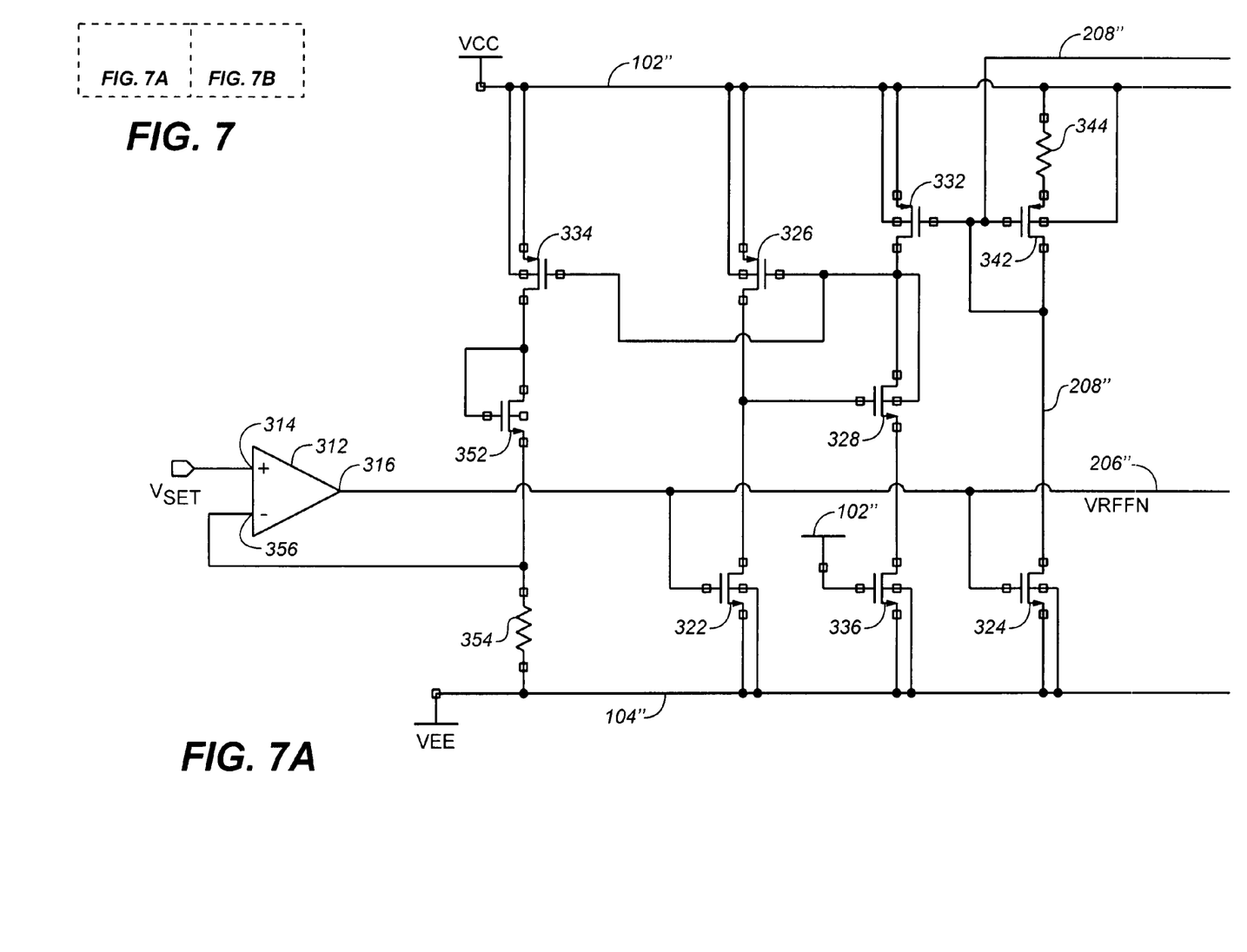
Figure 7B:
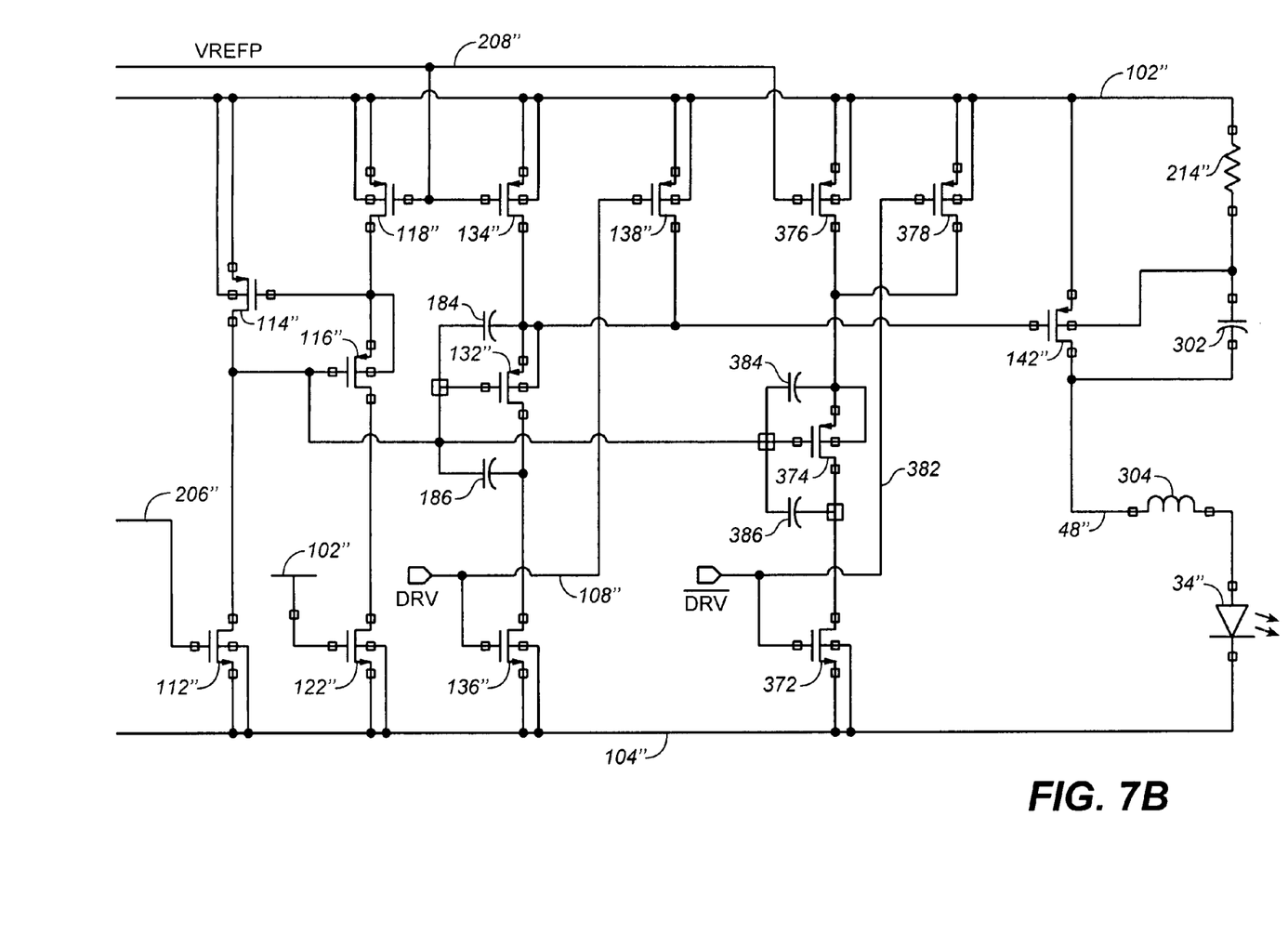

While each current source 62 may include an output stage either of the type depicted in FIG. 5 or of the type depicted in FIG. 6, each of the current sources 62 of the writing current circuit 42 preferably includes an output stage of the type depicted in the circuit diagram formed by FIGS. 7A and 7B. Those elements depicted in FIGS. 7A and 7B that are common to the illustrations of FIGS. 1-6 carry the same reference numeral distinguished by a double prime ("''") designation.

Referring initially to FIG. 7B, it is apparent that the output stage depicted in FIGS. 7A and 7B includes all of the MOS transistors 112, 114, 116, 118, 122, 132, 134, 136, 138 and 142 depicted in FIGS. 5 and 6. Furthermore, substrates, n-wells, sources, gates and drains of all of the MOS transistors 112", 114", 116", 118", 122", 132", 134", 136", 138" and 142" are respectively connected as depicted in FIG. 6 except that:

1. the output stage depicted in FIGS. 7A and 7B omits the resistor 212 so the source of the N-MOS transistor 112" connects directly to the VEE power line 104"; and
2. the respective n-wells of the P-MOS transistors 116", 132" do not connected to the VCC power line 102", but rather connect to these transistors' respective sources.

The output stage depicted in FIGS. 7A and 7B also differs from that of FIG. 6 by expressly depicting a parasitic capacitance 302 which exists between the substrate of the P-MOS transistor 142" and the drain thereof. The illustration of FIGS. 7A and 7B further differs from that of FIG. 6 by expressly depicting the laser diode 34" and an inductance 304 which inherently exist due to physical characteristics of:

1. bonding of an IC lead to a printed circuit board;
2. the printed circuit board's traces that respectively couple the IC's lead to the laser diode 34" and the laser diode 34" to the VEE power line 104"; and
3. the laser diode 34" itself.

Finally, in comparison with FIG. 6 FIG. 7A depicts a complementary voltage reference circuit for the output circuit which supplies the current-reference signals VREFN and VREFP respectively via:

1. the N-MOS current-reference signal line 206" to the gate of the N-MOS transistor 112" and;
2. the P-MOS current-reference signal line 208" to the gates of the P-MOS transistors 118", 134".

Preferably, the writing current circuit 42 includes only a single complementary voltage reference which is shared among the several current sources 62.

The complementary voltage reference depicted in FIG. 7A includes:

1. an input buffer amplifier 312 which produces the current-reference signal VREFN;
2. a laser diode simulator circuit; and
3. a positive bias generator circuit which generates the current-reference signal VREFP.

A non-inverting input 314 of the amplifier 312 receives a set-point voltage $V_{set}$ produced by a digital-to-analog converter ("DAC"), not illustrated in any of the FIGs., responsive to data supplied by the control processor 14 to the writing current circuit 42.

An output 316 of the amplifier supplies the VREFN signal to the gate of the N-MOS transistor 112" via the N-MOS current-reference signal line 206", and also to gates respectively of a N-MOS transistor 322 and of a N-MOS transistor 324. Sources and substrates respectively of the N-MOS transistors 322, 324 connect to the VEE power line 104". A drain of the N-MOS transistor 322 connects to a drain of a P-MOS transistor 326. A source and n-well of the P-MOS transistor 326 connect to the VCC power line 102". The drains both of the N-MOS transistor 322 and of the P-MOS transistor 326 connect to a gate of a P-MOS transistor 328. A source of the P-MOS transistor 328 connects to the transistor's n-well, to a drain of a P-MOS transistor 332, to a gate of the P-MOS transistor 326 and to a gate of a P-MOS transistor 334. Sources and n-wells respectively of the P-MOS transistors 332, 334 connect to the VCC power line 102". A drain of the P-MOS transistor 328 connects to a drain of a N-MOS transistor 336. A source and substrate of the N-MOS transistor 336 connect to the VEE power line 104". A gate of the N-MOS transistor 336 connects to the VCC power line 102".

A drain of the N-MOS transistor 324 connects via the P-MOS current-reference signal line 208" to a drain and gate of a P-MOS transistor 342, to the gate of the P-MOS transistor 332 and, to gates of the P-MOS transistors 118, 134 depicted in FIG. 7B. A resistor 344 in the range of 200Ω to 500Ω connects between the VCC power line 102" and a source of the P-MOS transistor 342, while an n-well of the P-MOS transistor 342 connects directly to the VCC power line 102".

A drain of the P-MOS transistor 334 connects to a drain and gate of a N-MOS transistor 352. A resistor 354, having a resistance which simulates that of the laser diode 34" $R_{354}= (I_{34"} \times R_{34"})/I_{354}$, connects between the VEE power line 104" and a source of the N-MOS transistor 352 with the source of the N-MOS transistor 352 being connected to an inverting input 356 of the amplifier 312.

Connected as depicted in FIG. 7A, the N-MOS transistor 352 establishes a MOS diode. The signal from the output 316 of the amplifier 312 is supplied to a bias generation circuit (composed of N-MOS transistors 322, 324 and 336 and P-MOS transistors 326, 328, 332 and 342 and resistor 344) to generate the VREFP signal at the gate of the P-MOS transistor 334. The voltage applied to the gate of the output P-MOS transistor 142" while the P-MOS transistor 142" supplies electrical current to the laser diode 34" equals that of the VREFP signal. Therefore, the P-MOS transistors 142", 334 form a current mirror whose accuracy is determined by the similarity of the voltage at the drains respectively of the P-MOS transistors 142", 334. The laser diode simulator (composed of the N-MOS transistor 352 and the resistor 354) simulates the electrical characteristics of the laser diode 34". Consequently, voltages at the drains of the P-MOS transistors 142", 334 are approximately equal. Establishing an accurate current mirror between the laser diode 34" and the laser diode simulator together with an accurate voltage buffer between the control voltage $V_{set}$ and voltage across the resistor 354 (which is proportional to the current flowing through the resistor 354) produces very good linearity between the control voltage $V_{set}$ and electrical current flowing through the laser diode 34".

As described previously, an electrical current supplied to the laser diode 34" which increases too swiftly or overshoots excessively can destroy a CD or DVD 16. To reduce the possibility of destroying CDs or DVDs 16, the output stage depicted in FIGS. 7A and 7B includes an overshoot control circuit depicted in FIG. 7B. The overshoot control circuit includes a N-MOS transistor 372 having its source and substrate connected to the VEE power line 104". A drain of the N-MOS transistor 372 connects to a drain of a P-MOS transistor 374. A source of the P-MOS transistor 374 connects to the transistor's n-well and to drains respectively of P-MOS transistors 376, 378. Sources and n-wells respectively of the P-MOS transistors 376, 378 connect to the VCC power line 102". A $\overline{DRV}$ signal, the logical inverse of the DRV signal, is applied via a $\overline{DRV}$ signal line 382 to gates respectively of the N-MOS transistor 372 and of the P-MOS transistors 378. A gate of the P-MOS transistors 376 receives the current-reference signal VREFP via the P-MOS current-reference signal line 208". A gate of the P-MOS transistor 374 connects to gates of the P-MOS transistors 116", 132" and to drains of the N-MOS transistor 112" and P-MOS transistor 114".

Connected as described above, one parasitic capacitor 384 exists between the source and gate of the P-MOS transistor 374 while another parasitic capacitor 386 exists between the drain and gate of the P-MOS transistor 374. Correspondingly, one parasitic capacitor 184 exists between the source and gate of the P-MOS transistor 132" while another parasitic capacitor 186 exists between the drain and gate of the P-MOS transistor 132". The parasitic capacitors 384, 386 couple switching transitions occurring in the $\overline{DRV}$ signal back to the gates of the P-MOS transistors 116", 132" and therethrough into the signal applied to the gate of the P-MOS transistor 142". Coupling switching transitions back to the gates of P-MOS transistors 116", 132" compensates for coupling effects of parasitic capacitors 184, 186 which produce overshoot in the electrical current supplied to the laser diode 34". It should be noted that for controlling overshoot in voltage applied via the current output line 48" to the laser diode 34" via the parasitic capacitors 384, 386 the sequence in which the DRV and $\overline{\text{DRV}}$ signals change state is very important. Specifically, the DRV signal must change state before the $\overline{\text{DRV}}$ signal changes state. Also applying the output current dependent current-reference signal VREFP via the P-MOS current-reference signal line 208" to gates of the P-MOS transistors 118, 134 and P-MOS transistors 376 also assists in controlling overshoot over a broad range of electrical current flowing through the laser diode 34". The presence of the resistor 214" connected between the VCC power line 102" and the n-well of the P-MOS transistor 142" also contributes to overshoot control by lowering the Q of the series resonant circuit established by the capacitance 302 and the inductance 304.

Industrial Applicability

Depending upon specific recording conditions, the electrical current which the writing current circuit 42 in accordance with the present invention supplies to the laser diode 34 when recording onto a DVD at 16× increases from a nominal value of approximately ten milliamperes ("ma") at time $t_0$ in FIG. 2 to several hundred ma at time $t_1$, a time interval of approximately one-half (0.5) nanosecond. When recording onto a DVD at 16×, the maximum electrical current supplied to the laser diode 34, $I_P$, may be as great as 500 ma.

Although the present invention has been described in terms of the presently preferred embodiment, it is to be understood that such disclosure is purely illustrative and is not to be interpreted as limiting. For example, a writing current circuit 42 in accordance with the present invention may include more or fewer than six (6) thermometer code registers 52. Similarly, a writing current circuit 42 in accordance with the present invention may include more or fewer than sixty-four (64) current sources 62. While the current source 62 preferably employs a P-MOS transistor 142 for supplying electrical current to the laser diode 34 via the current output line 48, a current source 62 in accordance with the present invention may instead use a N-MOS transistor therefor. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A writing current circuit (42) adapted for supplying a controlled electrical current to a laser diode (34) included in a drive (10) that is adapted for swiftly recording a Digital Video Disc ("DVD") (16), the writing current circuit (42) operating responsive both:
    a. to write control digital data for controlling operation of the writing current circuit (42), the write control digital data including data which specifies an amount of electrical current which the writing current circuit (42) controllably supplies to the laser diode (34); and
    b. to serial digital data which controls application of the electrical current to the laser diode (34) thereby specifying digital data to be recorded on the DVD (16), both the write control digital data and the serial digital data being received from a control processor (14) included in the drive (10), the writing current circuit (42) comprising:
    a plurality of separate current sources (62) each of which receives a single output signal from a current control register (58) included in the writing current circuit (42), the output signal respectively received by each current source (62) from the current control register (58):
    a. when in a first state activating the receiving current source (62) for supplying a particular quantity of electrical current to the laser diode (34); and
    b. when in a second state deactivating the receiving current source (62) for supplying the particular quantity of electrical current to the laser diode (34), each current source (62), in addition to receiving the single output signal from the current control register (58), also receiving both:
    a. a first current reference voltage signal which controls how much electrical current the current source (62) supplies to the laser diode (34) when the single output signal received by the current source (62) from the current control register (58) is in the first state;
    b. a second current reference voltage signal for controlling the charging electrical current supplied to the laser diode (34) by current source (62) when the single output signal received by the current source (62) from the current control register (58) initially enters the first state; and
    a complementary voltage reference circuit which, responsive to write control digital data from the control processor (14), controls both the first current reference voltage signal and the second current reference voltage signal, the complementary voltage reference circuit in controlling the first current reference voltage signal and the second current reference voltage signal simulating electrical characteristics of the laser diode (34) for improving linearity between the write control digital data received from the control processor (14) and electrical current supplied to the laser diode (34).

2. The writing current circuit (42) of claim 1 wherein a single complementary voltage reference circuit supplies the first current reference voltage signal and the second current reference voltage signal to all current sources (62) included in the writing current circuit (42).

3. A method for operating a writing current circuit (42) that is adapted for supplying a controlled electrical current to a laser diode (34) included in a drive (10), the drive (10) being adapted for swiftly recording a DVD (16), the writing current circuit (42) operating responsive both:
    a. to write control digital data for controlling operation of the writing current circuit (42), the write control digital data including data which specifies an amount of electrical current which the writing current circuit (42) controllably supplies to the laser diode (34); and
    b. to serial digital data which controls application of the electrical current to the laser diode (34) thereby specifying digital data to be recorded on the DVD (16), both the write control digital data and the serial digital data being received from a control processor (14) included in the drive (10), the method comprising the steps of:
    providing a plurality of separate current sources (62), each current sources (62) receiving a single output signal from a current control register (58) included in the writing current circuit (42), the output signal respectively received by each current source (62) from the current control register (58):
    a. when in a first state activating the receiving current source (62) for supplying a particular quantity of electrical current to the laser diode (34); and
    b. when in a second state deactivating the receiving current source (62) for supplying the particular quantity of electrical current to the laser diode (34), each current source (62), in addition to receiving the single output signal from the current control register (58), also receiving both:
a. a first current reference voltage signal which controls how much electrical current the current source (62) supplies to the laser diode (34) when the single output signal received by the current source (62) from the current control register (58) is in the first state; and
b. a second current reference voltage signal for controlling the charging electrical current supplied to the laser diode (34) by current source (62) when the single output signal received by the current source (62) from the current control register (58) initially enters the first state; and providing a complementary voltage reference circuit which, responsive to write control digital data from the control processor (14), controls both the first current reference voltage signal and the second current reference voltage signal, the complementary voltage reference circuit in controlling the first current reference voltage signal and the second current reference voltage signal simulating electrical characteristics of the laser diode (34) for improving linearity between the write control digital data received from the control processor (14) and electrical current supplied to the laser diode (34).

4. The method of claim 3 wherein only a single complementary voltage reference circuit is provided for supplying the first current reference voltage signal and the second current reference voltage signal to all current sources (62) included in the writing current circuit (42).

\* \* \* \* \*